United States Patent [19]

Imanari et al.

[11] 4,378,338

[45] Mar. 29, 1983

[54] CATALYST COMPOSITION FOR REMOVAL OF NITROGEN OXIDES AND A PROCESS FOR REMOVAL OF NITROGEN OXIDES

[75] Inventors: Makoto Imanari; Bunji Oshida, both of Ami, Japan

[73] Assignee: Mitsubishi Petrochemical Co. Ltd., Tokyo, Japan

[21] Appl. No.: 295,820

[22] Filed: Aug. 24, 1981

Related U.S. Application Data

[63] Continuation of Ser. No. 154,847, May 30, 1980, abandoned.

[30] Foreign Application Priority Data

Jun. 8, 1979 [JP] Japan .................................. 54-71102

[51] Int. Cl.³ .......................... B01J 8/00; C01B 21/00
[52] U.S. Cl. .................................... 423/239; 252/461; 252/464; 252/469; 252/472
[58] Field of Search ................ 423/239; 252/461, 464, 252/469, 472

[56] References Cited

U.S. PATENT DOCUMENTS

| | | | |
|---|---|---|---|
| 4,036,785 | 7/1977 | Saitoh et al. | 423/239 A X |
| 4,085,193 | 4/1978 | Nakayima et al. | 423/239 A |
| 4,221,768 | 9/1980 | Inoue | 423/239 |

Primary Examiner—O. R. Vertiz
Assistant Examiner—Gregory A. Heller
Attorney, Agent, or Firm—Sherman & Shalloway

[57] ABSTRACT

The present invention provides a catalyst composition and a process for reducing and removing nitrogen oxides with ammonia in the presence of molecular oxygen, said catalyst composition comprising at least three components of titanium, vanadium and magnesium and optionally tungsten, the titanium and tungsten being contained as oxides and the vanadium and magnesium being contained as oxides and/or sulfates. This catalyst composition is characterized by magnesium being substituted for all or part of expensive tungsten and has advantages of high activity with improved catalyst life and heat resistance.

6 Claims, No Drawings

CATALYST COMPOSITION FOR REMOVAL OF NITROGEN OXIDES AND A PROCESS FOR REMOVAL OF NITROGEN OXIDES

This is a continuation, of application Ser. No. 154,847, filed May 30, 1980 now abandoned.

The present invention relates to a process for removal of nitrogen oxides by heat treatment of waste gases containing nitrogen oxides and oxygen in the presence of ammonia and to a catalyst composition used in such a process. More particularly, it relates to a process for removal of nitrogen oxides which comprises contacting with a specified catalyst in the presence of ammonia waste gases containing nitrogen oxides, such as NO and $NO_2$ (hereinafter called $NO_x$ for short), and oxygen contained in discharged gases from various power-generating or industrial boilers, various heating furnaces, nitric acid plants, coke furnaces, sintering furnaces and burners for activated sludge and trash, etc, and to a catalyst composition used in such a process.

The discharging of $NO_x$ into the air causes environmental pollution such as photochemical smog, and various methods have been proposed for removal of $NO_x$ from $NO_x$-containing waste gases. Of those methods the catalytic reducing decomposition method involving the using, as a reducing agent, of ammonia is expected to find a wide range of applications, entailing such merits as to be capable of selective removal of $NO_x$ even in the case of highly concentrated oxygen-containing waste gases and capable of application to gases containing NO alone as nitrogen oxides without making it always necessary for $NO_2$ needed for the absorption method and the like to be present.

Conventionally many catalysts are reported for use in this method. Of these, catalysts composed of oxides or sulfates, in part, of titanium in combination with vanadium, molybdenum, iron and so forth are most widely used for commercial purposes since they are excellent in activity as well as in durability to sulfur oxides ($SO_2$ and $SO_3$, hereinafter called $SO_x$ for short) contained in waste gases.

These catalysts, however, are weak in heat resistance and if used for a long time, cause the growth of crystals of catalyst components with reduction in the catalyst surface area. This is what is called the sintering phenomenon and it entails such shortcomings as to lower the catalyst activity by this influence. In the case of catalyst poisoning with $SO_x$ the activity is readily recovered by heating, but the lowering in the activity due to the sintering brought about by heating is the so-called permanent deterioration incapable of regeneration and it suffers a great loss when commercially practiced. True, the catalyst poisoning with $SO_x$ is recovered by heating, but if heating is repeatedly effected with the purpose of regeneration, the sintering phenomenon is caused, ending with the lowering of the activity. The case being so, denitration catalysts must be as good in heat resistance as possible.

One of the instant inventors disclosed in the U.S. Pat. No. 4,085,193 that catalysts containing (A) titanium (Ti) as component A and
(B) at least one element, as component B, selected from the group consisting of iron (Fe), vanadium (V), molybdenum (Mo), tungsten (W), nickel (Ni), cobalt (Co), copper (Cu) and chromium (Cr), with the proviso that when vanadium (V) is contained as the component B, at least one of molybdenum (Mo) and tungsten (W) is contained, should be excellent catalysts, being high in activity and long in catalyst life, in the said process for removal of $NO_x$ involving the using of ammonia as reducing agent. The said U.S. Patent discloses that the Ti-W-V type catalyst should be excellent in activity as such a catalyst (refer to column 10).

This Ti-W-V type catalyst entails such drawbacks as to go high in costs because of containing tungsten (W) and it will have an extremely great economical significance if it is possible to substitute inexpensive components for all or part of tungsten (W).

The instant inventors furthered studied the said Ti-W-V type catalyst for the solution of this problem, in consequence of which magnesium was found to be capable of substitution for all or part of tungsten (W).

The present invention is concerned with a process for removal of nitrogen oxides which comprises contacting nitrogen oxides with a catalyst containing at least titanium, vanadium and magnesium in the presence of oxygen and ammonia at temperatures ranging from 150° to 650° C. Magnesium taking the place of tungsten produces the similar effects in the catalyst activity with improved heat resistance of catalyst and in addition, it is by far lower in costs than tungsten.

The said U.S. discloses that besides the said component A and component B, as optional component D, a number of elements, such as Ag, Be, Mg, Zn, B, Al, Y, rare earth elements, Si, Nb, Sb, Bi, Mn and so on, could be contained in a form of an oxide, but it was quite impossible to predict from the disclosures of the said United States Patent that of these many optional components D magnesium (Mg) alone should have such a specific action as to be capable of substitution for tungsten (W).

Somewhat similar catalysts to that of the present invention are disclosed in (1) Japanese Laid-Open Patent Application No. 51-126992, (2) Japanese Laid-Open Patent Application No. 51-126993, (3) Japanese Laid-Open Patent Application No. 51-67278 and (4) Japanese Laid-Open Patent Application No. 51-92729. These applications are all concerned with catalysts for removal of nitrogen oxides, but they are characterized by carriers and aluminum oxide carriers are described as indispensable components. Disclosures are made there of denitration catalysts in which titanium oxide takes part in the carrier of aluminum oxide and there are supported on the said carrier oxides of those, as base metals, belonging to Groups IIa, Va, VIa, VIIa, VIII, Ib and lanthanum in the periodic table. In fact, base metals cited in Examples or Referential Examples are confined to 4 members of Fe, Cr, V and Cu (including, in part, their combinations), but there are none of Mg-containing examples.

Moreover, no specific disclosure is made of the Ti-W-V type catalyst in these Laid-Open Applications. Not only that, but there is no disclosures of the specific action of magnesium such as to substitute for all or part of the W of the Ti-W-V type catalyst.

The catalyst of the present invention is remarkable in the effect when used in the specified composition range. For the preferred composition range, in an atomic ratio in percent, titanium is contained in the amount of not less than 50%, but less than 98%, vanadium not less than 0.1%, but less than 50%, magnesium not less than 1% but less than 30% and tungsten not less than 0%, but less than 50%. The addition of tungsten to titanium and vanadium serves to improve the catalyst activity, whereas the addition of magnesium does not necessarily bring about the improvement of the catalyst activity. Hence, tungsten should preferably be left over in a small amount in terms of activity. For the more preferred range, therefore, in an atomic ratio in percent, titanium should be contained in the amount of not less than 50%, but less than 97%, vanadium not less than 0.1%, but less than 50%, magnesium not less than 1%, but less than 30% and tungsten not less than 1%, but less than 50%. It does not necessarily imply that catalyst compositions falling outside the said range are unusable, but they are not preferred in that the activity is lowered.

The catalyst of the present invention should preferably contain:

| tungsten (W) | 0 to 1 atom, |
| magnesium (Mg) | 0.01 to 0.6 atom, |
| vanadium (V) | 0.001 to 1 atom | for one atom of titanium (Ti) and in particular,

| tungsten (W) | 0.01 to 1 atom, especially 0.01 to 0.3 atom, |
| magnesium (Mg) | 0.01 to 0.6 atom, especially 0.01 to 0.4 atom, |
| vanadium (V) | 0.001 to 1 atom, especially 0.001 to 0.3 atom | for one atom of titanium (Ti).

In the catalyst composition of the present invention titanium and tungsten are contained as oxides, whereas magnesium and vanadium can be contained as oxides or sulfates or in a form of the both.

Optional compounds which form oxides or sulfates by heating can be used for raw materials of the catalyst of the present invention. As raw materials of titanium are preferred titanium hydroxide, titanium oxide, meta titanic acid and compounds capable of converting to titanium hydroxide by neutralizing with aqueous ammonia, such as titanium tetrachloride, titanium trichloride, titanyl sulfate and so on. As raw materials of vanadium are preferred ammonium meta vanadate, vanadium oxide, vanadyl sulfate and so forth. It is ammonium meta vanadate that is particularly preferred, but this should preferably be used dissolved in water containing oxalic acid or ethanol amine or the like. As raw materials of magnesium are preferred magnesium chloride, magnesium oxychloride, basic magnesium carbonate, magnesium nitrate, magnesium sulfate, magnesium hydroxide, magnesium oxide and so forth. As raw materials of tungsten are preferred tungsten oxide, ammonium paratungstate, silicotungstic acid and so forth.

The catalyst of the present invention can be prepared by following optional procedures if it is possible to commercially practice and there can be finally obtained those products which are mixtures or compounds of oxides or sulfates or in a composite oxide and sulfate form. In general, first, hydrates of titanium, such as titanium hydroxide, meta titanic acid and so on, or mixtures of these ones with titanium oxide are admixed with aqueous solution of ammonium metavanadate or ammonium paratungstate and magnesium compound, or aqueous solution of said compounds with the addition of assistants, such as oxalic acid, ethanol amine and so on, and heated while being mixed with thorough stirring for evaporation of water to make solids having appropriate softness, then extrusion moulded into a suitable form, dried and finally calcined at temperatures of 300°–700° C. for 1–10 hours to use as catalyst.

For the improvement of catalyst strength clay, silica, silica-alumina, alumina zirconia, gypsum, boric acid, borax and so forth could be used at the time of mixing with stirring in the said steps, and further incorporation of inorganic fibers, such as glass fibers, kao-wool and so on, will serve to improve the strength. For imparting suitable fine pores to the catalyst flammable organic high molecular weight polymers, such as methyl cellulose, polyethylene glycol, starch, graphite, cotton and so on, can be mixed and the mouldability is simultaneously improved.

The catalyst of the present invention can be used in such optional forms as pellet, granule, ring, pipe, honeycomb and so on. The catalyst of the present invention can be used in reactors of optional forms usually available for solid catalysts, such as moving bed, fluidized bed or fixed bed.

The temperatures at the time of reaction fall in the range of 150°–650° C. and preferably 200°–500° C. Usually, the Ti-V type catalyst is used in the temperature range of 200° to 400° C. At temperatures beyond those limits the so-called sintering phenomenon occurs and the activity deteriorates with the lapse of time, but the catalyst of the present invention, because of containing magnesium, is usable without causing the deterioration even at temperatures in excess of that range and specifically, even at the reaction temperatures in order of about 450° C. and it find use in a widespread range of applications to various waste gases.

The catalyst, if used in $SO_x$-containing waste gases, is lowered in activity with part of the catalyst being sulfonated or with adhesion of salts, such as ammonium sulfate, acidic ammonium sulfate and so on, but it can be regenerated by stripping off the adhered salts or reacted sulfate radicals by way of heating treatment at temperatures of 350° C. or more, preferably 400° C. or more and more preferably 500° C. or more. With conventional Ti-V type catalysts, however, repeated heat treatment causes the sintering phenomenon, bringing about the deterioration in activity, but the catalyst of the present invention containing magnesium, and magnesium and tungsten, in particular, possesses such unexpectedly excellent properties as not to go inferior in activity even if repeatedly heat treated.

It is not necessary to particularly set the limitation on the pressure at the time of reaction and good results can be expected in the pressure range from reduced pressure to 10 kg/cm$^2$ or more. For gas space velocity (SV) for the catalyst of the present invention it is used in the range of 2,000 to 100,000/hour and preferably 3,000 to 60,000/hour.

In the catalyst of the present invention, molar ratio of ammonia/$NO_x$ should preferably be in the range of 0.5 to 2. Molecular oxygen is usually contained in the amount of several percent (volume percent, hereinafter percent (%) and ppm for the gas composition are all based on volume) in the waste gas and the particular necessity for the addition of molecular oxygen hardly occurs. When $NO_2$ is present as nitrogen compound in a great amount, molecular oxygen is not needed for the reaction, but it is mostly NO that is usually contained as nitrogen oxide in the waste gas.

For the effect of the present invention, as mentioned earlier, magnesium can be substituted for all or part of expensive tungsten and cost of the catalyst can be cut down and the present invention can improve the heat resistance of the catalyst. The catalyst of the present invention entails another such great effect as to be lower in the $SO_2$ oxidizing activity as compared to other Ti-V type catalysts. In general, $SO_x$ is present in combustion exhaust gases. Heavy oil combustion exhaust gases are great in the amount of $SO_x$ and 50 to 2,000 ppm of $SO_2$ and $SO_3$ in order of about 3% that quantity are usually present. This $SO_3$ is very strongly acidic and intensively corrodes the apparatus and with the formation of salts, such as acidic ammonium sulfate, ammonium sulfate and so on, with the coexisting ammonia it gives rise to such trouble as to cause the corrosion and blockade of the apparatus. Consequently, the occurrence of $SO_3$ must be prevented insofar as possible. From this point of view the function of the catalyst of the present invention being low in the $SO_2$ oxidation activity is highly appreciated.

The catalyst compositions of the invention may be diluted with inert solid carriers such as silica, alumina, silica-alumina, diatomaceous earth, acidic terra abla, activated clay, various porcelain materials, and zeolites; or may be carried on such inert solid carriers by such means as tumbling granulation. For example, commercial rutile or anatase-form titania which are used as pigment has extremely low catalytic action according to our experiments, but it is useful as a solid diluent or carrier as abovementioned. Regardless of which of the specific solid diluent carrier is used, it may occupy as much as approximately 80% or even more of the entire catalyst system.

The catalyst of the present invention contains said metal components A, B and C as indispensable, and besides these three components, may contain, for instance, those components which follow; Be, Ca, Sr, Ba, B, Ga, In, Tl, Ge, Pb, As, Sb, Bi, Y, Ta, Cr, Mn, Zn, Cd, Ag, Cu and rare earth elements, in such a small amount as 1% by weight or less, preferably 0.5% by weight or less, in total, based on a total amount of the three component elements A, B and C. Further, alkali metal may be contained in the amount of 0.5% by weight on the same basis. Moreover, Al, Si, Sn, P, Zr, Nb, Mo, Fe, Co and Ni may be contained in a considerably great amount in the amount of 3% by weight or less on the same basis as oxide or sulfate.

The present invention will be explained with the reference to working examples as follows. The following examples, however, will in no way limit the present invention.

EXAMPLE 1

800 g of titanium tetrachloride ($TiCl_4$) was taken and dissolved in 4,000 ml of ice water and 3 N aqueous ammonia was added to neutralize the solution. The resulting precipitate was separated by filtration, and washed thoroughly with distilled water. 1,671 g of the resulting cake (319.6 g as $TiO_2$, corresponding to 4.0 mols) was admixed with aqueous solution of 26 g (0.22 mol) of ammonium meta vanadate ($NH_4VO_3$), 11.6 g (0.04 mol as W) of ammonium paratungstate (($NH_4)_{10}W_{12}O_{41}.5H_2O$) and 45.6 g (0.18 mol) of magnesium nitrate ($Mg(NO_3)_2.6H_2O$), evaporated and concentrated while being mixed with thorough stirring. By the addition of 3.6 g of polyethylene glycol solids obtained were milled in the wet state in a mixer into extrudable paste. The paste was extrusion moulded into a pellet 8 mm in diameter. This one was dried and then calcined in a muffle furnace at 550° C. for 5 hours. Pellets obtained were chopped to 8 mm in length.

The resulting catalyst contained oxides of Ti, W, V and Mg with a composition of a metallic atomic ratio of Ti:W:V:Mg=9:0.1:0.5:0.4. 200 ml of this catalyst was taken and packed in a stainless reactor 35.7 mm in inner diameter and 420 mm in length provided in the center with a stainless thermocouple protective tube and heated externally in an electric furnace.

The gas being treated was waste gas from the kerosene boiler with the addition of NO, $NH_3$, $SO_2$ and $SO_3$ and had the following composition.

NO 200 ppm, $NH_3$ 200 ppm, $SO_2$ 300 ppm, $SO_3$ 5 ppm, $O_2$ 11.5%, $H_2O$ 6.6%, $CO_2$ 4.7% and $N_2$ being the balance.

Further, $SO_3$ was introduced by oxidizing $SO_2$ in part.

The hereinafter-described Table-1 shows results obtained by passing this gas at a space velocity (SV)=20,000 $hr^{-1}$ (based on the empty column calculated in terms of 0° C. and 1 atm) and reaction temperature of 450° C. for 1000 hours.

$$\text{NO reduction rate} = \left(1 - \frac{\text{NO in the exit gas}}{\text{NO in the feed gas}}\right) \times 100$$

The measurement of NO was effected by Model 951 $NO/NO_2$ analyzer, a product of Toshiba-Beckman.

EXAMPLE 2

Catalyst was prepared in the same way as in example 1 except that the amount of magnesium nitrate was increased to 57 g (0.22 mol) instead of adding ammonium paratungstate whereby there was obtained a catalyst with a composition of Ti:V:Mg=9:0.5:0.5 (in an atomic ratio). Table-1 shows results obtained by using this catalyst in the same way as in Example-1.

COMPARATIVE EXAMPLE-1

By following the same preparative procedures as in Example-1 there was obtained a catalyst with a composition of Ti:V=9.5:0.5 (in an atomic ratio) and Table-1 shows results obtained by using this catalyst likewise as in Example-1.

COMPARATIVE EXAMPLE-2

By following the same preparative procedure as in Example-1 there was obtained a catalyst with a composition of Ti:W:V=9.4:0.1:0.5 (in an atomic ratio) and Table-1 shows results obtained by using this catalyst likewise as in Example-1.

TABLE 1

| | NO reduction rate % Time elapsed | | |
|---|---|---|---|
| | 10 hours | 150 hours | 1000 hours |
| Example-1 | 95.8 | 95.0 | 95.0 |
| Example-2 | 94.5 | 93.8 | 94.0 |
| Comparative Example-1 | 94.2 | 79.6 | 66.7 |
| Comparative Example-2 | 94.8 | 92.2 | 88.6 |

It is noted from Table-1 above that the catalyst of the present invention is so good in heat resistance that it is usable at high temperatures for long hours.

EXAMPLES-3~-10

By following the same preparative procedures as in Example-1 there were prepared catalysts having various composition ratios as shown in Table-2 with the final calcining temperatures of which the two or three were changed. These catalysts were milled to 28–42 mesh and packed in the amount of 5 ml in a quartz reaction tube with an inside diameter of 16.5 mm, including a thermocouple protective tube made of quartz and having an outside diameter of 5 mm. The outside portion of the reaction tube was heated in an electric furnace and gas with the following composition was reacted at space velocity of 50,000 hr$^{-1}$ and reaction temperature of 450° C. for 100 hours and then further reacted at 200° C. and 250° C. Results obtained were shown in Table-2.

Gas composition: NO 200 ppm, NH$_3$ 200 ppm, SO$_2$ 500 ppm, O$_2$ 4%, H$_2$O 7.1% and N$_2$ being the balance.

TABLE 2

| Example No. | Composition (in an atomic ratio) | | | | Calcining temperature °C. | NO reduction rate % | |
|---|---|---|---|---|---|---|---|
| | Ti | W | V | Mg | | 200° C. | 250° C. |
| 3  | 9   | —   | 0.5 | 0.5 | 500 | 72.4 | 99.1 |
| 4  | 9   | —   | 0.5 | 0.5 | 550 | 77.9 | 99.9 |
| 5  | 9.4 | —   | 0.5 | 0.1 | 500 | 42.8 | 93.0 |
| 6  | 7.4 | 0.1 | 0.5 | 2   | 500 | 47.4 | 96.8 |
| 7  | 7.4 | 0.1 | 0.5 | 2   | 550 | 62.6 | 98.5 |
| 8  | 9   | 0.1 | 0.5 | 0.4 | 500 | 78.1 | 99.9 |
| 9  | 9   | 0.1 | 0.5 | 0.4 | 550 | 85.8 | 100  |
| 10 | 9   | 0.1 | 0.5 | 0.4 | 575 | 70.0 | 99.2 |

EXAMPLES-11~-13

Table-3 shows results obtained by preparing catalysts with a composition of Ti:W:V:Mg=9:1:0.5:0.4 (in an atomic ratio) changing raw materials of magnesium in the same preparative procedures as in Example-1 and reacting likewise as in Example-3.

TABLE 3

| Example No. | Raw material of Mg | NO reduction rate % | |
|---|---|---|---|
| | | 200° C. | 250° C. |
| 11 | MgCl$_2$.6H$_2$O | 83.5 | 100 |
| 12 | MgSO$_4$ | 82.3 | 100 |
| 13 | Basic magnesium carbonate | 80.0 | 100 |

EXAMPLE-14

After reacting in the presence of the catalyst prepared in Example-1 at the reaction temperature of 250° C. for 200 hours using the same gas composition as in Example-1 by means of the same reaction apparatus as used in Example-1 the catalyst was calcined and regenerated with air at 500° C. for 3 hours and space velocity of 10,000 hr$^{-1}$. The activity after repeating this operation 25 times was 90% in the NO reduction rate at conditions of space velocity of 10,000 hr$^{-1}$ and 250° C. and the activity at the same conditions 10 hours after the initiation of the reaction was 93%.

COMPARATIVE EXAMPLE-3

Using the same catalyst as used in Comparative Example-1, regeneration tests were repeatedly conducted 5 times at the same conditions as in Example-14. The NO reduction rate 10 hours after the initiation of the reaction was 82%, but the reduction rate after 5 times of regenerations was 56%.

TEST EXAMPLE-1

The catalyst prepared in Example-1 being milled to 10–20 mesh was taken in the amount of 8 ml and packed in a reaction tube made of quartz with an inside diameter of 19.5, including a quartz thermocouple protective tube having an outside diameter of 5 mm and heated externally in an electric furnace. Gas with the following composition was passed in.

O$_2$ 5%, SO$_2$ 500 ppm and N$_2$ being the balance Gas space velocity 10,250 hr$^{-1}$ SO$_2$ oxidation rate was calculated by determining SO$_3$ formed by the oxidation of SO$_2$ by the heating salt method and titrating with caustic soda by absorbing the whole SO$_2$ on hydrogen peroxide and calculated by the following equation according to the Yoshimori et al method (literature, Takayoshi Yoshimori and Makoto Nonomura, "JAPAN ANALYST", 23, 356(1974)).

$$SO_2 \text{ oxidation rate} = \frac{\text{Amount of } SO_3 \text{ formed}}{\text{Total } SO_2 \text{ amount}} \times 100$$

The total SO$_2$ amount agreed always with the amount of SO$_2$ fed. The SO$_2$ oxidation rate at the reaction temperature of 400° C. determined by this method was nearly 0% until 10 hours after the initiation of the reaction, but it was 6.5% after 20 hours, 9.5% after 30 hours and it remained unchanged after that.

COMPARATIVE TEST EXAMPLE-1

Using the same catalyst as used in Comparative Example-1, the SO$_2$ oxidation rate was measured at the same conditions as in Test Example-1.

The SO$_2$ oxidation rate 10 hours after the initiation of the reaction was 16.8% and it remained much the same after that.

EXAMPLE-15

A catalyst having a metallic atomic ratio of Ti:V:Mg=9:0.5:0.5 was prepared by following the same procedures as in Example-1. The final calcining temperature, however, was set at 500° C. and 550° C. each for 5 hours. The NO$_x$ reducing activity was measured at the same conditions as in Example-3. Pretreatment at 450° C. for 100 hours, however, was not effected. Further, the SO$_2$ oxidizing activity was measured by following the same procedures as in Test Example-1. The reaction temperature, however, was set at 450° C. Table-4 shows results.

COMPARATIVE EXAMPLES-4~-18

Catalysts incorporated with Li, Na, K, Ca, Ba, Mn, P, Pb, Sn, Zn, Cr, Si, Al or Ta in the same metallic atomic ratio 0.5 instead of Mg in the catalyst of Example-15 and the same catalyst lacking Mg were prepared in the same way as in Example-1. However, the temperature and time for the final calcination were identified as those of Example-15. The NO$_x$ reducing activity and SO$_2$ oxidizing activity were measured in the same way as in Example-15. Results were shown in Table-4. The "third component" in Table-4 refers to Mg or its substitute component.

TABLE 4

| No. | Third component | NO reduction rate at 200° C. (%) Calcined at 500° C. | NO reduction rate at 200° C. (%) Calcined at 550° C. | $SO_2$ oxidation rate (450° C.) % |
|---|---|---|---|---|
| Example-15 | Mg | 74 | 81.3 | 14 |
| Comparative Example-4 | Li | 53 | 56.5 | 16 |
| Comparative Example-5 | Na | 18.3 | — | — |
| Comparative Example-6 | K | 26.7 | 20 | — |
| Comparative Example-7 | Ca | 36 | 59 | 18 |
| Comparative Example-8 | Ba | 34 | 52 | 18 |
| Comparative Example-9 | Mn | 68 | 44 | — |
| Comparative Example-10 | P | 50 | 55 | — |
| Comparative Example-11 | Pb | 35 | 28 | — |
| Comparative Example-12 | Sn | 56 | 59 | 16 |
| Comparative Example-13 | Zn | 26.1 | 32 | 17 |
| Comparative Example-14 | Cr | 47 | 49 | 83 |
| Comparative Example-15 | Si | 72 | 41 | 37 |
| Comparative Example-16 | Al | 68 | 58 | — |
| Comparative Example-17 | Ta | 72 | 56 | — |
| Comparative Example-18 | none | 73 | 59.2 | 36 |

As noted from Table-4, some of catalysts calcined at 550° C. go markedly lower in activity than catalysts calcined at 500° C. Such catalysts have difficulty with heat resistance and are not considered to be suitable for commercial usage for long periods. Specifically, catalysts using, as the third component, Mn, Si, Al and Ta and catalyst lacking the third component correspond to those catalysts. Catalysts incorporated with Na, K, Ca, Ba, P, Pb, Sn, Zn, Cr and so forth are low in the activity itself. Furthermore, the Cr-containing catalyst is markedly high in the $SO_2$ oxidizability and entails commercial difficulty.

EXAMPLE-16

The honeycomb type catalyst composition 2517 g of meta titanic acid (contained in the amount of 30% as titanium oxide), an intermediary product on the occasion of preparation of titanium oxide by the sulfuric acid process, was adjusted to pH 9.5 with 15% aqueous ammonia under stirring. 128 g of magnesium nitrate $(Mg(NO_3)_2.6H_2O)$ dissolved in 500 ml of water and 5.9 g of ammonium metal vanadate dissolved in 500 ml of water were added and heated while being thoroughly mixed for evaporation of water to make a cake. This one was moulded into a honeycomb form (form of pore: square, opening: 6 mm, wall thickness: 1.0 mm and opening rate: 65%). The resulting moulded product was dried at 100° C. for 24 hours and then calcined in the air at 550° C. for 6 hours. The catalyst so obtained was cut off to a 4 pored rectangular parallelopipe 10 cm in length. Those pieces were placed in a reaction tube made of quartz and finely divided quartz was packed in between the tube walls and the catalyst walls and reaction gas was allowed to pass through pores alone. The reaction gas had the composition of 400 ppm of NO, 500 ppm of $NH_3$, 500 ppm of $SO_2$, 6% $H_2O$ and 4% $O_2$. This gas passed through the said catalyst bed at flow of 100 1/hour. Denitration rate at the reaction temperature of 350° C. was 96%. Then, gas with the composition of 500 ppm of $SO_2$, 5% $O_2$ and $N_2$ being the balance was passed over the instant catalyst to measure the $SO_2$ oxidation rate, in consequence of which it was nearly 0% at 400° C. and 1.5% or less at 450° C.

The instant example shows that the catalyst containing a small amount of vanadium should be practically usable.

EXAMPLE 17 AND COMPARATIVE EXAMPLES-19~-33

Influences of the member X in the composition of Ti-V-X

Catalysts with a composition of Ti:V:X=9.45:0.05:0.5 (in an atomic ratio) were prepared in the same way as in Example-1. Measurements were made of these catalysts for the $NO_x$ reducing activity and $SO_2$ oxidizing activity in the same way as in Example-15. Table-5 shows results so obtained.

TABLE 5

| No. | Third component | NO reduction rate at 300° C. Calcined at 550° C. | $SO_2$ oxidation rate (450° C.) % |
|---|---|---|---|
| Example 17 | Mg | 89.0 | 3.5 |
| Comparative Example 19 | Li | 67.0 | 4.1 |
| Comparative Example 20 | Na | — | — |
| Comparative Example 21 | K | 22.7 | — |
| Comparative Example 22 | Ca | 69.0 | 4.5 |
| Comparative Example 23 | Ba | 61.0 | 4.5 |
| Comparative Example 24 | Mn | 53.7 | — |
| Comparative Example 25 | P | 64.3 | — |
| Comparative Example 26 | Pb | 34.9 | — |
| Comparative Example 27 | Sn | 69.0 | 4.1 |
| Comparative Example 28 | Zn | 40.2 | 4.3 |
| Comparative Example 29 | Cr | 57.6 | 26.5 |
| Comparative Example 30 | Si | 49.7 | 9.8 |
| Comparative Example 31 | Al | 68.0 | — |
| Comparative Example 32 | Ta | 67.0 | — |
| Comparative Example 33 | none | 67.5 | 9.5 |

What we claim is:

1. A process for removal of nitrogen oxides which comprises contacting nitrogen oxides in the presence of molecular oxygen and ammonia at temperatures of 150°-650° C. with a catalyst composition consisting essentially of the following components in the following ratios:
   (A) one atom of titanium (Ti),
   (B) 0.001 to 1 atom of vanadium (V),
   (C) 0.01 to 0.6 atom of magnesium (Mg),
   (D) 0 to 1% by weight, based on the total amount of the components (A), (B), and (C) of at least one element selected from the group consisting of Be, Ca, Sr, Ba, B, Ga, In, Tl, Ge, Pb, As, Sb, Y, Ta, Cr, Mn, Zn, Cd, Ag, Cu and rare earth elements, and (E) 0 to 3% by weight, based on the total amount of the components (A), (B), and (C), of at least one element selected from the group of Al, Si, Sn, P, Zr, Nb, Fe, Co, and Ni, said titanium as component (A) being contained as oxides and the said components (B), (C), (D), and (E) being contained as oxides, sulfates, or their mixtures.

2. The process according to claim 1, wherein the catalyst composition consists essentially of the following components in the following ratios:
(A) one atom of titanium (Ti),
(B) 0.001 to 0.3 atom of vanadium (V),
(C) 0.01 to 0.4 atom of magnesium (Mg).

3. The process according to claim 1, wherein said contacting temperature is maintained in the range of 200°–500° C.

4. The process according to claim 3, wherein said contacting temperature is maintained at at least 250° C.

5. A catalyst composition for reducing and removing nitrogen oxides which consists essentially of the following components in the following ratios:
(A) one atom of titanium (Ti),
(B) 0.001 to 1 atom of vanadium (V),
(C) 0.01 to 0.6 atom of magnesium (Mg),
(D) 0 to 1% by weight, based on the total amount of the components (A), (B), and (C), of at least one element selected from the group consisting of Be, Ca, Sr, Ba, B, Ga, In, Tl, Ge, Pb, As, Sb, Bi, Y, Ta, Cr, Mn, Zn, Cd, Ag, Cu, and rare earth elements, and
(E) 0 to 3% by weight, based on the total amount of the components (A), (B), and (C), of at least one element selected from the group of Al, Si, Sn, P, Zr, Nb, Fe, Co, and Ni, said titanium as component (A) being contained as oxides and the said components (B), (C), (D), and (E) being contained as oxides, sulfates, or their mixtures.

6. The catalyst composition of claim 5, wherein said catalyst composition consists essentially of the following components in the following ratios:
(A) one atom of titanium (Ti),
(B) 0.001 to 0.3 atom of vanadium (V),
(C) 0.01 to 0.4 atom of magnesium (Mg).

* * * * *